Sept. 26, 1939.   B. J. ANDERSON   2,174,026
CHILD'S VEHICLE
Filed Jan. 29, 1937   3 Sheets-Sheet 1

BERT J. ANDERSON
INVENTOR.

BY Leon T. Hooper
ATTORNEY.

Sept. 26, 1939.    B. J. ANDERSON    2,174,026
CHILD'S VEHICLE
Filed Jan. 29, 1937    3 Sheets-Sheet 2

BERT J. ANDERSON
INVENTOR.
BY Leon T. Hooper
ATTORNEY.

Sept. 26, 1939.  B. J. ANDERSON  2,174,026
CHILD'S VEHICLE
Filed Jan. 29, 1937  3 Sheets-Sheet 3
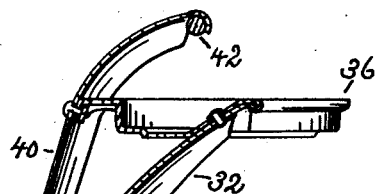
FIG. 10
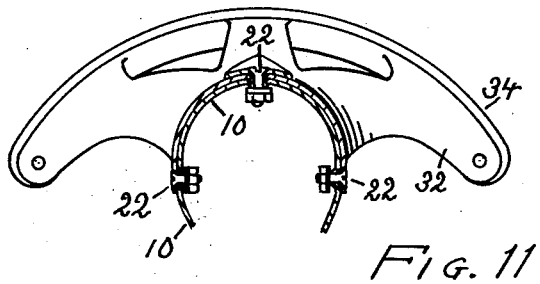
FIG. 11
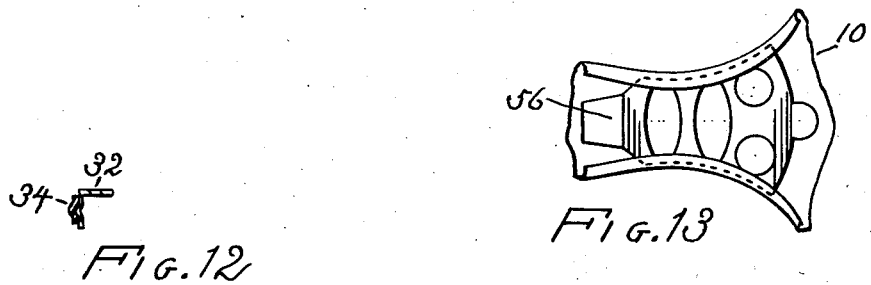
FIG. 12
FIG. 13
BERT J. ANDERSON
INVENTOR.
BY Leon T. Hooper
ATTORNEY.

Patented Sept. 26, 1939

2,174,026

UNITED STATES PATENT OFFICE 2,174,026

CHILD'S VEHICLE

Bert J. Anderson, Hammond, Ind.

Application January 29, 1937, Serial No. 122,934

1 Claim. (Cl. 280—47)

This invention relates to an improved child's vehicle which is made up from a limited number of associated stampings or the like.

One of the principal objects of advantage of the vehicle of this invention resides in the provision of means whereby the device may be shipped knocked down and readily and easily assembled at its destination without the aid of special tools and by operators without any previous skill in assembling such devices.

A still further important object of advantage of this invention resides in the provision of means for quickly converting the vehicle from a walker to a stroller.

Additional objects of advantage and importance will become apparent as the following detailed description progresses, reference being had to the accompanying drawings, wherein:

Figure 10 is a section taken on line 10—10 of Figure 9 and shows the preferred method of securing the tray to associated members.

Figure 11 is a section of the front member taken on line 11—11 of Figure 1.

Figure 12 is a section taken on line 12—12 of Figure 2.

Figure 13 is a bottom plan view of a portion of the body and shows the relative position of the torque member.

As shown in the drawings:

Figure 1:
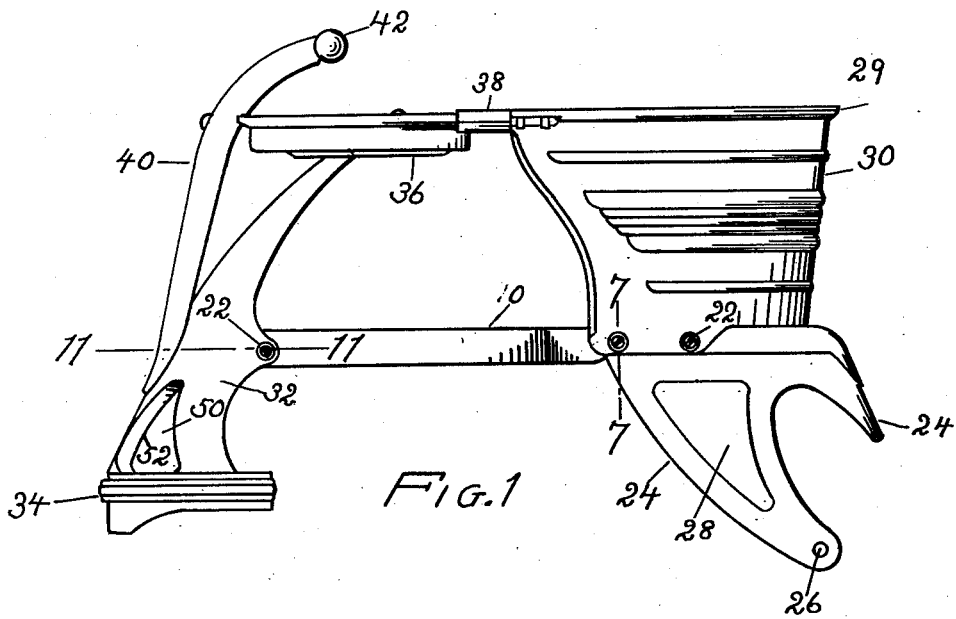
Figure 1 is a side elevational view of a child's vehicle which embodies the invention.

The reference numeral 10 indicates in general the platform or body of the improved vehicle. In the preferred construction of the vehicle the body 10 is formed of a single stamping as is clearly shown in Figures 2 and 3.

The body 10 is preferably of racket shaped formation and has a rear portion considerably wider than the forward or central portion.

Figure 4:
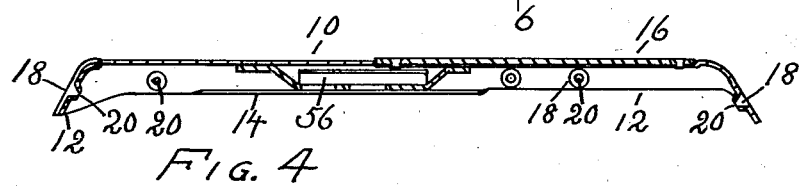
Figure 4 is a longitudinal section taken on line 4—4 of Figure 3.
Figure 5:
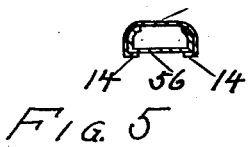
Figure 5 is a transverse section taken on line 5—5 of Figure 3.
Figure 6:
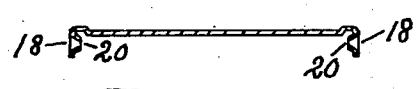
Figure 6 is a transverse section taken on line 6—6 of Figure 3.

The edges 12 of the body are turned downwardly as is best shown in Figures 4, 5 and 6. The downwardly turned edges in addition to enhancing the appearance of the device also give the body a rigidity not otherwise obtainable. It will be noted that the rear portion of the body is sloped to carry out streamline effects in keeping with modern vehicles.

Portions of the downwardly turned edges adjacent the transverse center of the body 10 are turned inwardly as is best shown in Figures 4, 5 and 13, to provide a smooth rounded surface to prevent chaffing or injury to a child's legs coming in contact therewith.

In the preferred construction of the body 10, substantially the entire surface of the seating surface of the rear end is depressed to receive a seat panel 16. The panel 16 is preferably constructed of wood although it is obvious that any other suitable material may be used.

Figure 9:
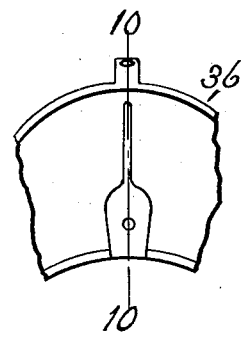
Figure 9 is a plan view of a fragmental portion of a tray.
Figure 8:
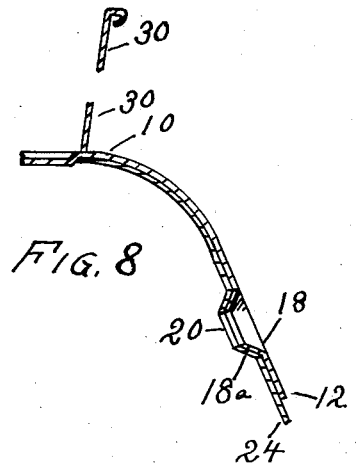
Figure 8 is a slightly enlarged sectional view taken on line 8—8 of Figure 1, portions thereof being broken away.

Formed in the downwardly turned sides of the body 10 is a plurality of inwardly projecting depressions 18 which are best shown in Figures 4, 8 and 9. The depressions 18 are centrally apertured to receive securing bolts 22.

The depressions 18 in addition to forming locating means in the assembly of the associated parts also provide a much more rugged and sturdy construction than the conventional hole and bolt alone.

Figure 7:
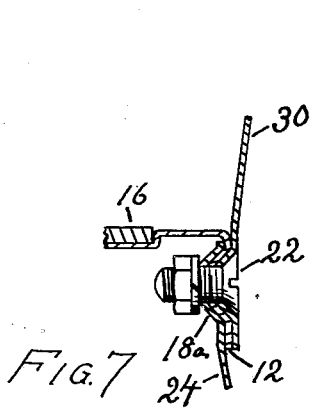
Figure 7 is a slightly enlarged section of a fragmental portion of the vehicle taken on line 7—7 of Figure 1.

Secured to the inner surface of the downwardly turned part of the rear portion of the body 10 is a bolster member 24. The bolster member 24 is formed of a single stamping and is provided with a plurality of inwardly projecting depressions 18a which register and coact with the inwardly projecting depressions 18 in the body 10, as is best shown in Figures 7 and 8. It will be noted that the rear end of the bolster member 24 projects downwardly and rearwardly which construction in addition to carrying out streamlining effects also provides a bracing element which lends rigidity and sturdiness to the improved vehicle.

Each side of the bolster member 24 extends downwardly and rearwardly and is apertured 26 near the lower end to receive an axle. In the preferred construction of the improved vehicle the downwardly and rearwardly extending sides of the bolster member 24 are ribbed or embossed 28, as is best shown in Figure 1, to stiffen the member and prevent weaving in the assembled vehicle.

Figure 2:
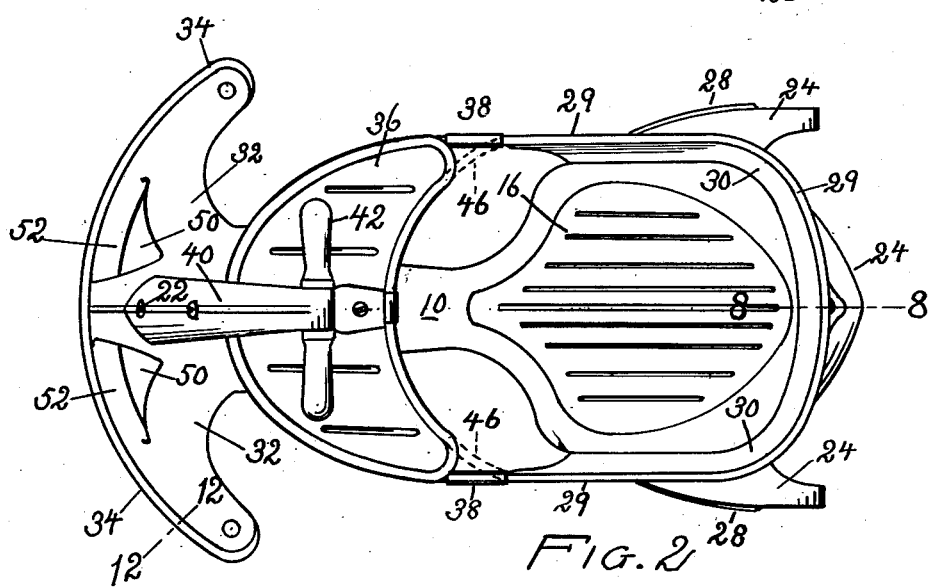
Figure 2 is a top plan view thereof.
Figure 3:
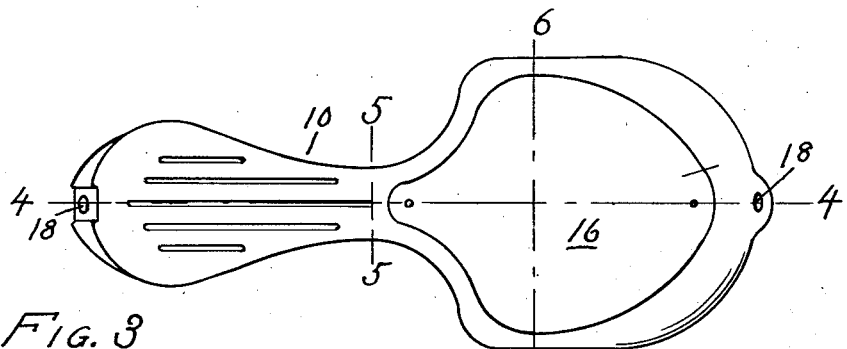
Figure 3 is a top plan view of the platform portion of the vehicle.

Positioned on the upper surface of the body 10 and extending entirely across the rear thereof as is clearly shown in Figures 1 and 2 is a substantially U-shaped back rest member 30. A portion of the lower edge of the back rest member 30 is secured to the side portions of the body 10, as is best shown in Figures 1 and 7. Inwardly projecting bosses and depressions together with securing bolts are employed in securing the posts in their respective places.

The upper edge 29 of the backrest member 30 is rolled or curled upon itself to form a wide upper edge. The backrest is preferably ribbed for appearance and to stiffen the part.

Positioned at the front end of the body 10 is a stamped member 32, the lower part of which extends outwardly, as is best shown in Figures 1 and 2, to receive supporting casters or pivoted wheels. The upper portion of the member 32 extends above the level of the body 10 and is curved rearwardly as is clearly shown in Figure 1.

The body 10 and the member 32 are secured together by means of the apertured depressions 18 and securing bolts 22.

The lower front portion of the member is semi-circular in plan and is adapted to have a resilient bumper member 34 attached thereto.

Positioned on the upper portion of the member 32 and removably secured thereto is a tray 36. The outermost portions of the tray 36 at the rear thereof are connected to the front portion of the backrest member 30 by the handle members 38. The connection gives the entire structure an added rigidity and also provides a handle to assist a youngster in entering or leaving the device.

Removably secured to the front of the tray 36 is a post member 40, the upper end of which curves rearwardly and is provided with a handle 42. The lower end of the post member 40 is secured to the member 32 by a securing bolt 22 which extends through and is fastened to the under side of the body 10. The post member 40 is preferably formed from a single stamping and is substantially semi-circular in cross-section.

The upper end of the stamped member 32 is curled downwardly, as indicated by the reference numeral 44 in Figure 10, and is secured within the curled rim of the tray 36.

When the improved vehicle of this invention is converted into a stroller the tray 36 and post member 40 is removed. A rod 46, as indicated by the dotted lines in Figure 2, is inserted for use as a handrail.

Portions of the lower part of the stamped member are struck out to form apertures 50, the edges 52 of which are turned inwardly to enable the member to resist strain and to enhance the appearance thereof.

Secured to the under surface of the body 10, preferably by spot welding, is a torque member 56. The torque member 56 in addition to being secured to the under surface of the body is also secured to the downwardly turned sides thereof as is clearly shown in the drawings. A plurality of apertures are provided in the torque member 56 to facilitate welding the member to the downwardly turned sides of the body.

It will be apparent from the foregoing that herein is provided a rugged and sturdy vehicle which may be economically manufactured in large quantities.

It will also be obvious that the improved vehicle may be shipped or stored knocked-down and that it will require but a small amount of storage or shipping space due to the fact that its limited number of parts may be easily and quickly assembled by unskilled persons without the aid of special tools.

I am aware that numerous details of construction may be varied throughout a wide range without departing from the principles of the invention and I, therefore, do not purpose limiting the patent granted hereon other than as necessitated by the prior act.

I claim as my invention:

In a child's vehicle, a stamped metal body having downwardly turned edges, a plurality of locating bosses projecting inwardly from said downwardly turned portions, each of said bosses having an aperture therein a bolster secured to the inner sides of the downwardly turned portions, said bolster having a plurality of apertured boss receiving indentations adapted upon assembly to be in registry with bosses on said body, and means for maintaining said bosses in said indentations.

BERT J. ANDERSON.